INVENTORS
Leslie A. Wenn & William K. Bishop.
BY Louis Illmer
THEIR ATTORNEY

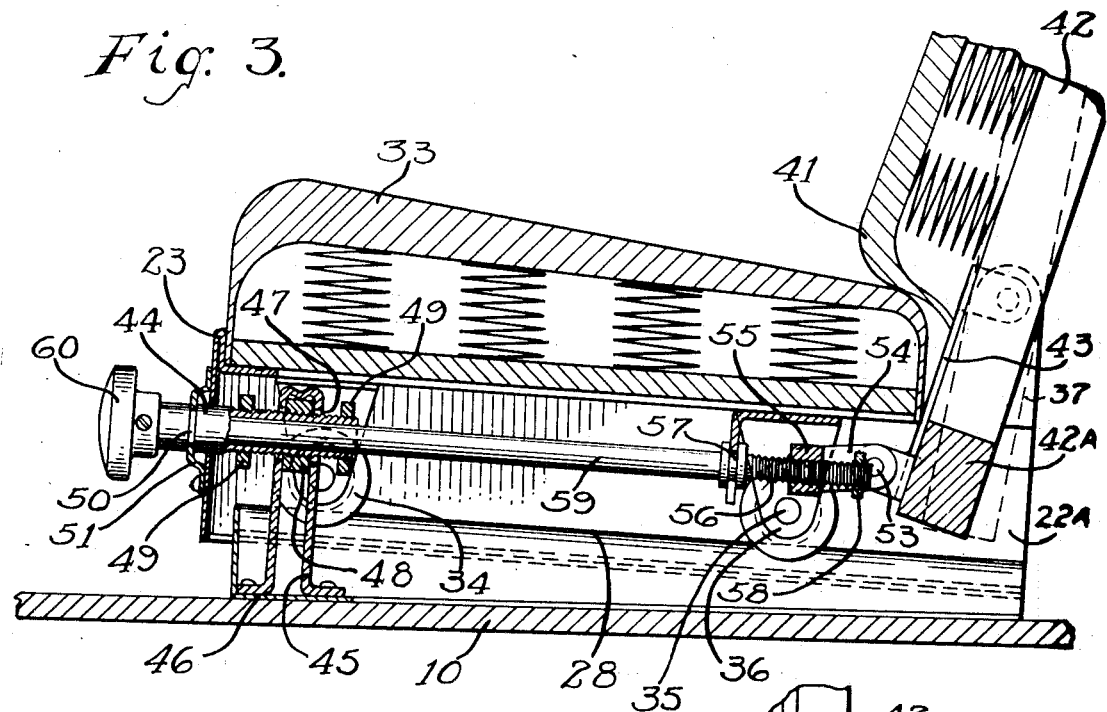

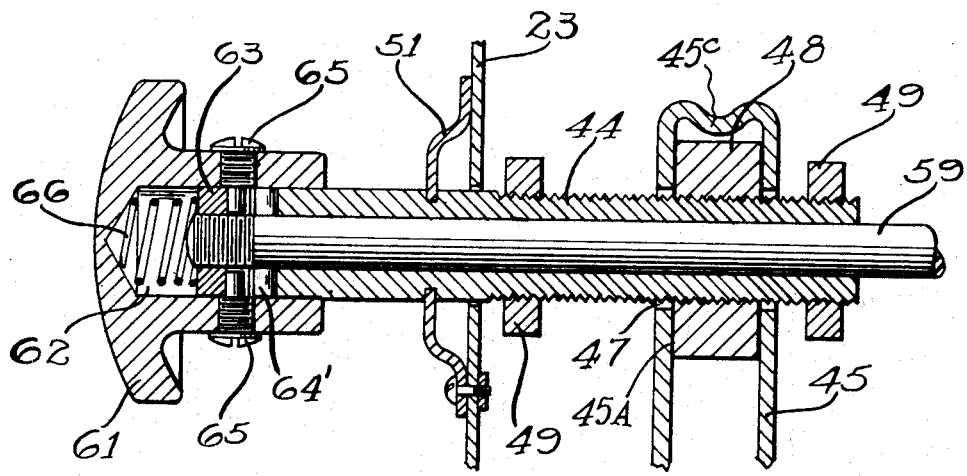
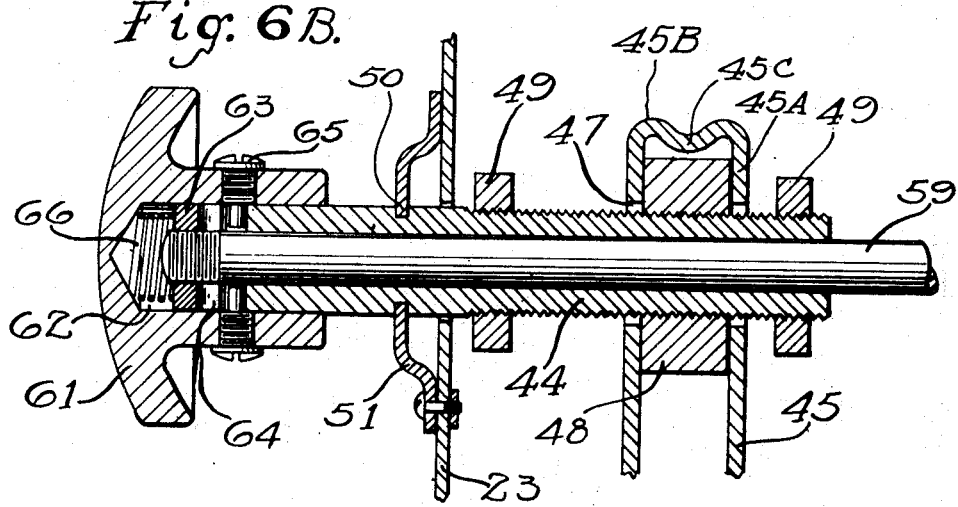

Sept. 8, 1931.   L. A. WENN ET AL   1,822,427
VEHICLE SEAT ADJUSTER
Filed March 20, 1929   4 Sheets-Sheet 4
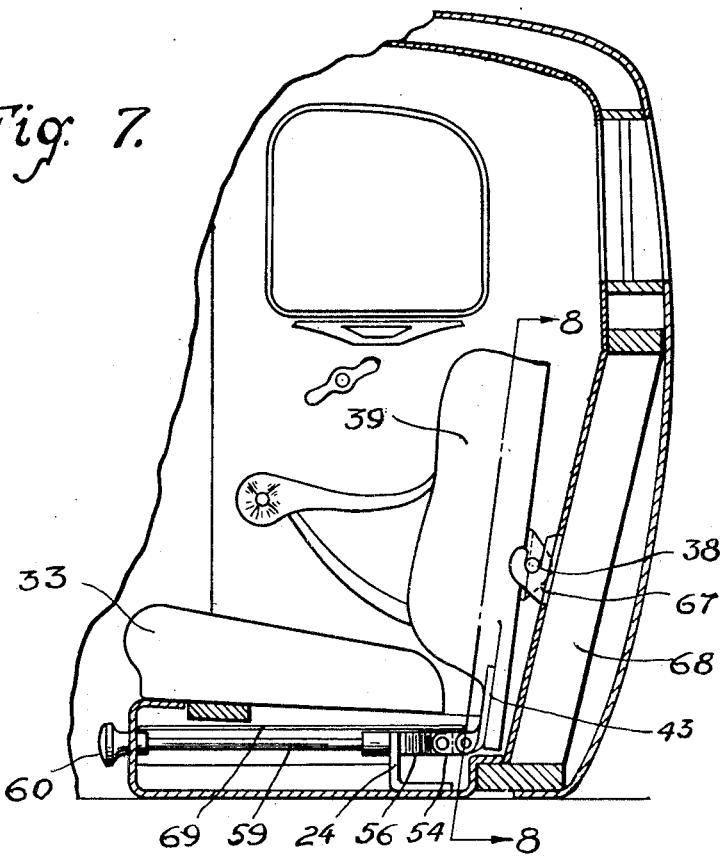
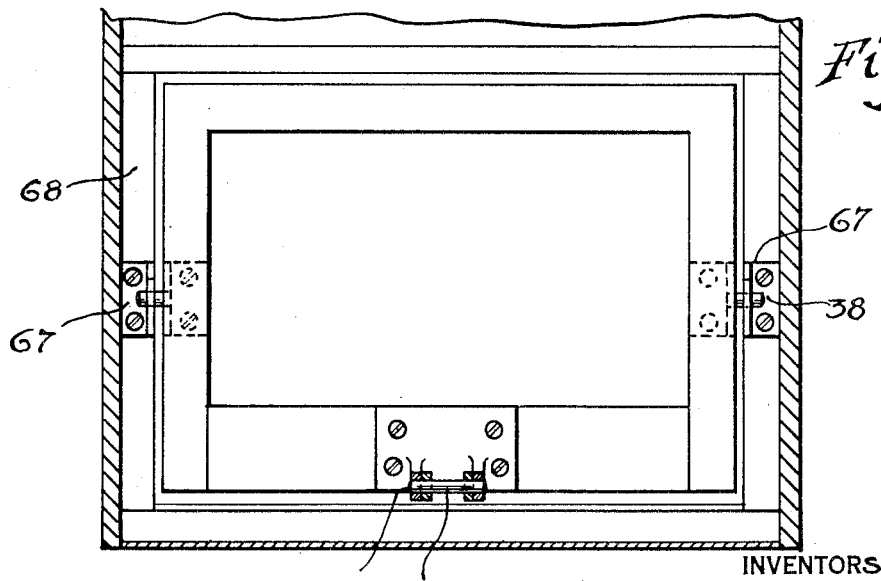
INVENTORS
Leslie A. Wenn & William K. Bishop.
BY
Louis Illmer
THEIR ATTORNEY Patented Sept. 8, 1931

1,822,427

UNITED STATES PATENT OFFICE

LESLIE A. WENN AND WILLIAM K. BISHOP, OF BINGHAMTON, NEW YORK, ASSIGNORS TO THE BREWER-TITCHENER CORPORATION, OF CORTLAND, NEW YORK, A CORPORATION OF NEW YORK

VEHICLE SEAT ADJUSTER

Application filed March 20, 1929. Serial No. 348,561.

This invention relates to a seat mechanism for effectively adjusting automobile or like vehicle seats, and in particular, provides for a comfortable driver's seat that can readily be shifted toward or away from the steering wheel and otherwise allows of an unfettered manipulation of the car pedals. By the use of our improvements, the back member may also be made reclinable with respect to its seat. A centralized control of the dual operating type is provided for bodily shifting said seat, and the manipulative element thereof is brought forward and placed within convenient reach of a seated driver; said single adjusting device at the same time serves to alter the inclination of the back member. An outstanding feature of the present invention therefor resides in mounting a reclinable back upon a shiftable seat frame as used in combination with suitable means for maintaining the back and seat in adjusted relation while they are being simultaneously shifted with respect to the vehicle floor board. Certain component elements of our adjusting devices also afford means for solely tilting the back of a stationary rear automobile seat and may be applied thereto without requiring the seat cushion to be shiftably mounted.

The primary object of our improvements is to provide for a strong, durable and self-contained mechanism of the character indicated, that will largely comprise simple sheet-metal stampings capable of being economically applied beneath the front seat of a conventional automobile without necessitating any extensive changes in the prevailing structure thereof.

As applied to a shiftable front seat as an instance, the present invention aims to devise a suitable metal base frame for this purpose adapted to ride between a pair of stationary tracks or other guideways that are kept parallelly spaced and may be anchored to the floor of the car. Our seat adjusting mechanism is preferably of the positive screw type carried by and concealed within said slidable seat frame; this screw is in turn provided with a single manipulative control element comprising clutch means adapted to selectively allow of either adjustably sliding the seat along said track or of changing the inclination of the back and thereby affording a wholly restful pose on part of the occupant.

To this end and the accomplishment of other new and useful results, said invention further consists in novel features of structure and seat manipulation, all of which will hereinafter be more fully set forth.

Reference is had to the accompanying four sheets of drawings which are illustrative of a specific embodiment of our invention particularly as applied to automotive purposes, in which like characters of reference indicate like parts, and in which:

Fig. 2 represents an elevational view of our seat as taken transversely of a motor car along the section line 2—2 of Fig. 1, while Fig. 3 shows a sectional view of this same seat assembly as taken longitudinally of the motor car along line 3—3 of Fig. 2.

Fig. 4 is a perspective top view of the assembled frame members to which the seat cushion and back upholstery have not as yet been applied; Fig. 5 shows a similar fragmental view of certain track and frame details.

Figs. 6A and 6B respectively show in enlarged scale, some further structural features of our seat adjusting devices and its cooperating clutch as placed in transposed operative positions.

Fig. 7 represents an elevational view in section of a a seat assembly that is similar to Fig. 3 but is differentiated therefrom by showing our adjustable tilting devices applied to the back of a rear automobile seat without however having the seat cushion made longitudinally shiftable.

Fig. 8 is a detailed view taken along line 8—8 of Fig. 7 to indicate the corresponding modification in the back pivot brackets that may be resorted to in such association.

Figure 1:
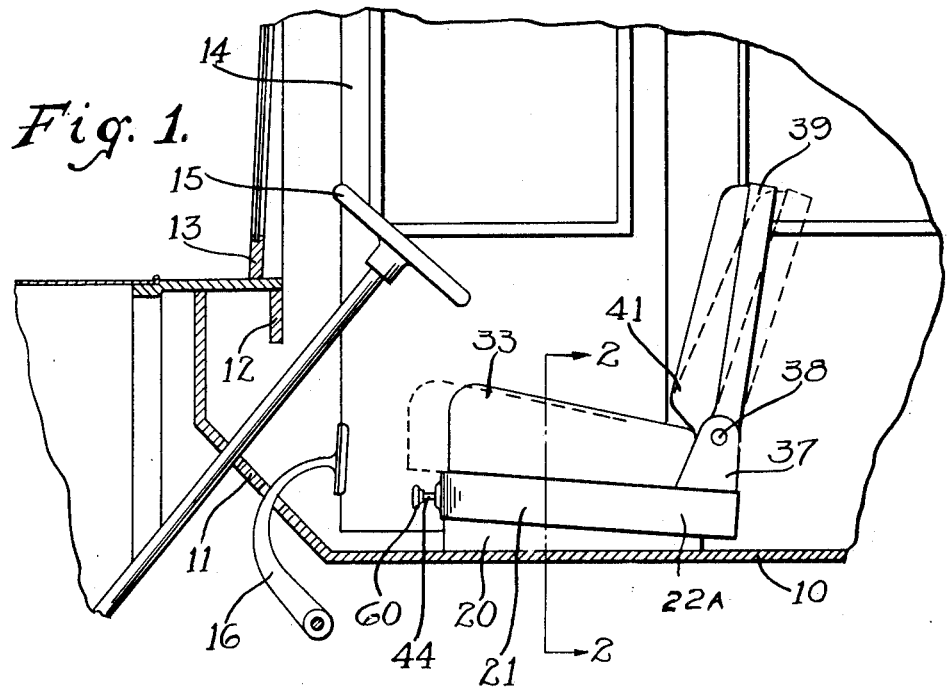
Fig. 1 is a fragmentary elevational view as taken in longitudinal section through the body portion of an automobile showing the front seat thereof equipt with our improved adjusting mechanism.

Referring first to Fig. 1, this is intended to schematically indicate certain conventional motor car elements indirectly associated with our devices, such as a body floor board 10, an upturned foot board 11, an instrument board 12, a windshield 13, a front side door 14, a steering wheel 15, a car control pedal 16, and the like. Located rearwardly of said wheel is shown a transversely disposed driver's seat equipt with our improvements; this seat embodies a pair of laterally spaced guide rails or tracks 20 preferably made from sheet metal. Said rails may be fixedly anchored to the floor board 10 in any suitable manner and resting across and adapted to slide longitudinally therealong, is a sheet metal skeleton base frame 21 comprising complementary channel-shaped side-bars 22. The forward ends thereof may be interconnected by a suitable cross member such as 23 adapted to neatly trim the front of the base, while the respective rear frame ends are shown provided with a tie piece 24 which in this instance is fashioned from an angle iron whose one leg is provided with a medially disposed keeper slot 25. Said metal base frame may be made up of one or more separately formed pieces that are welded or otherwise adjoined into a substantially integral unit.

Figure 2:
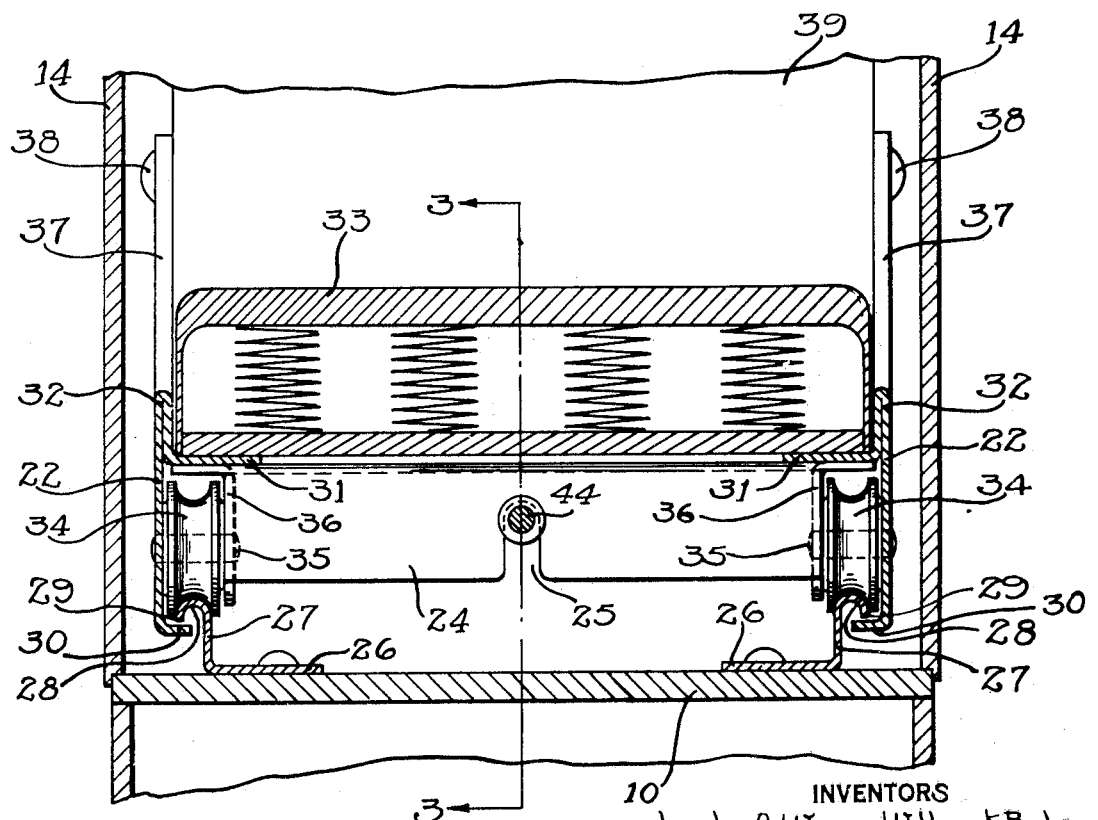

Referring further to the structural details of our spaced track members 20, these may comprise a pair of rail sections each of whose profile includes a floor engaging flange 26 and an upturned web element 27 having its upper free edge crimped over to constitute a rail head 28 providing for a depending abutment edge 29 that is kept substantially parallel to the rounded runner face of the respective tracks. Relative to the disposition given our guide rails, their respective flanges 26 are purposely turned inwardly and the depending rail abutment edges faced outwardly so as to permit of the upholstered seat ends being carried closely adjacent to the respective body sides as shown in Fig. 2.

It will also be observed that the channel shaped side-bars of our base frame 21 are respectively adapted to cooperate with said rails, each of the component bars 22 having its lower flange 30 directed inwardly and arranged to slidably underlie its adjacent depending rail edge 29 for seat retaining purposes. The upturned web of each such bar is made to carry a depressed lip-like flange 31; the latter is circumscribed by a centering bead 32 into which the removable seat cushion 33 may freely drop in the conventional manner. If desired, said bead may likewise be run along the top edge of the forward cross-member 23 for the purpose of fully trimming said upholstered seat cushion. In order to facilitate longitudinal movement of our unitary frame lengthwise of said rails, the innermost faces of the respective side bars 22 may each be provided with a plurality of fore and aft rollers such as 34; each such roller is preferably mounted upon a pin 35 having one end supported by the web of the side bar and the opposite end thereof carried by an adjoined overhanging angle bracket such as 36. The base frame may be made to overrun the rails as indicated, and said frame may be given an overall length dimension that is substantially equal to the entire width space afforded within the car body interior; if preferred however, a plurality of narrower frames may be set side by side, in which event each of the individual seats so provided for may be made independently adjustable relative to their carrying rails.

Attention will now be directed to the tiltable back member of said seat and our improved mode of pivotally mounting the back with respect to said base frame 21. Referring to Fig. 4, it will be seen that each of the flange lips 31 is shown cut back somewhat with respect to the rear end of their side bars and preferably made to terminate in a substantially flush relation to the rear vertical face of the seat cushion 33. Each such side bar is however carried rearwardly thereof to constitute spaced complementary web extensions such as 22A. Secured to each inner extension face, is here shown an upright sheet metal pivot bracket 37 adapted to mount the respective raised fulcrum pins 38 about which the reclinable back structure 39 is as a whole intended to tilt.

The last named structure generally comprises a rectangular wooden frame-work including complementary side posts 42 and a cross piece 42A upon which the back cushioned upholstery 41 may be assembled. It is preferred to dispose the back fulcrum pins intermediate the respective post ends and thus provide for a depending pivoted back frame portion adapted to be adjustably inclined from underneath the cushioned seat member 33. It is emphasized that said depending back frame portion is shown carried down below the rear bottom face of the seat cushion and between the spaced web extensions 22A into overlapping relation to the respective frame side posts, thus providing for a back enclosure that gives a neat and pleasing trim to the rear of our motor seat assembly. That is to say the depending bottom portion of the tiltable back frame serves to transversely close the otherwise open rear ends of the longitudinal shiftable base 22. To this end, the bottom cross piece 42A is preferably extended to substantially align with the complementary rail heads 28 in the manner depicted in Fig. 3. The frame cross piece 42A may be swung directly under and into vertical alignment with the spaced trunnions 38 while the back is still kept in upright relation to the plane of the seat cushion. By virtue of this particular disposition, our seat tilting screw may also be made to directly engage the center region of said cross piece to best advantage and without need of intermediary gearing other than a suitable interconnecting linkage such as will presently be described.

Provision if further made for corner braces such as 43, which as disclosed in Fig. 4, embody the use of complementary metal straps of which their respective outermost ends engage the fulcrum pivots 38 while their respective opposite strap ends are carried inwardly and forwardly of the cross piece 42A into offset spaced relation adapted to carry therebetween a nut means of the swivel type by which said back may be positively tilted within reasonable limits. In order to further impart ample lateral rigidity to said pivot brackets, reenforcing straps such as 40 (see Fig. 5) may be provided for, having an inwardly projecting tongue 40A that may be secured to a leg end of the tie piece 24.

Now will be described, a positive screw mechanism by means of which our seat members may be selectively manipulated. In the present instance, there is shown a tubular seat adjusting screw 44 having threads cut upon the exterior thereof, said screw being concealed within the base frame 21 and its axis made to lie in a parallel relation to the side-bars thereof. If desired, an inverted trough-shaped cover 69 (schematically shown by Fig. 4 in dotted outline) may be placed over the screw mechanism to protect same against interference in the event the interior of the seat frame should be used for tool storage purposes or the like. The rearward end portion of said screw 44 may be carried by a stationary U shaped nut prop 45 having spaced leg members adapted to rest upon a support plate such as 46, which in turn may be screwed to the floor board 10 and is preferably bent up and tied across the forward ends of the rails 20 to serve as a trim piece therefor as shown in Fig. 3. Said prop may be provided with aligned apertures 47 through which the seat screw 44 may be loosely fitted; mounted thereon and shiftably confined between the prop legs or holder means, is a self-aligning seat adjusting nut block 48. The use of a conventional square nut 48 provides for a radially irregular wrench surface about its thread axis and this axis is preferably disposed in a parallel relation to the rail-heads 28. The nut ends may be made to slidably thrust against the respective innermost vertical retaining faces 45A of the prop holder, the mounting being such that the nut is restrained against axial movement but allowed a limited degree of freedom crosswise of the thread axis. The crown or crosswall 45B of said prop may be provided with a stop-lug 45C that is normally kept cleared from the nut surface to provide for play in the non-binding fashion indicated by Figs. 6A and 6B. The corner region of the nut surface is intended to strike the lug and thus prevent the nut from being unobstructedly dragged around while the screw is manipulated.

The forward end portion of the seat screw may further be equipt with a groove 50 or the like adapted to engage with a thrust plate 51 which may be removably attached to the forward cross member 23 of the base frame 21. The described structure is such that by the turning of the screw 44 into or out of the fixedly held nut 48, the seat frame together with its inclined back appurtenances, may bodily be slid along the rail rollers into any desired position of adjustment.

Turning now to the additional mechanism required to both shift the seat position and adjust the inclination of the back, this may be brought about by the use of an auxiliary back screw means preferably arranged in the tandem manner shown in Fig. 3. The adjacent end portions of the previously described corner braces 43, may be bent into alignment and each provided with a pivot or other suitable aperture such as 53 designed to mount and cooperate with a suitable screw compensating device; the latter may comprise a pair of toggle links 54 respectively attached to the spaced brace apertures 53 and adapted to pivotally carry the oppositely trunnioned adjusting nut 55 or its equivalent therebetween; said links prevent rotation of the nut and allow the back member to swing unrestrainedly about its support pivots 38 while being tilted. Provision is further made for a back adjusting screw 56 preferably disposed in a rearward relation to the tubular seat screw 44 and mounted to rotate in common axial alignment therewith. Said back screw may be equipt with a shouldered groove 57 adapted to seat into the keeper slot 25 as formed in the rear tie piece 24 and these cooperating elements constitute thrust collar means for the back adjusting screw. The last named member may also be provided with stop means such as 58 which confine the screw travel and hold back tilt within predetermined limits. The forward end of the back screw 56 may further be provided with a centered extension stem 59 which is shown rotatably carried through the interior of the tubular seat screw 44 and beyond the forward end thereof.

From the preceding description, it will be apparent that rotation on part of said stem, will cause the rear adjusting nut 55 either to advance or recede with respect to its thrust collar 57 and this will correspondingly alter the inclination of the seat back relative to the plane of the seat frame. It will also be observed that the manipulative controls for both the seat screw and the back screw have herein been centralized and brought to a common point situated immediately below the forward portion of the seat top and placed within convenient reach of the car driver.

Attention will now be directed toward one mode of interlocking said controls adapted to expedite the making of one or the other of the cited seat adjustments. For this purpose, we provide for a screw clutch designated as a whole as 60, and this may comprise a single knob-like or other manipulative element 61 having a centered bore 62 that is slidably fitted over the forward end of the seat screw 44. As detailed in Figs. 6A and 6B, the stem 59 is provided with an enlarged end shoulder 63 of approximately the same diameter as said knob bore and this shoulder may be equipped with one or more rearwardly faced clutch notches such as 64. The foremost end face of the tubular screw is likewise provided with oppositely faced notches 64', and between each such pairs of complementary notches, there may be provided an interlocking clutch pin 65 which is here shown as carried by said knob and made to project into the bore interior. A clutch spring 66 tends to thrust the knob away from the shoulder 63 and normally throws said clutch pin into operative engagement with the shoulder notches 64. When positioned as shown in Fig. 6A, any turning of the knob will cause the inclination of the back to be altered. However, by merely pushing the knob rearwardly against spring tension, said pin will be released and thrown into its alternate operative position shown in Fig. 6B where a turning of the knob will cause the seat together with its adjusted back to be moved fore or aft depending upon the direction of rotation given to the adjusting screw 44.

The described screw mechanism affords a large degree of leverage adapted to positively shift the seat members, which thereupon remain fixedly held in any such position until again readjusted. The relatively long guideways 20 as used in conjunction with a centrally disposed adjusting screw, enable the described mechanism to unobstructively shift the seat therealong without having to resort to any supplementary linkage for preventing cocking or seat binding. Furthermore, the provision for rollers and like compensating devices reduces friction losses while the mounting of our base frame with respect to the anchored rails is such, that the seat cannot be unintentionally lifted out of place. In this connection, attention is also directed to the relative movement that is afforded between our self-aligning seat nut 48 and its support prop. By virtue of the enlarged prop apertures 47 and the provision for a slidable mounting between the prop legs, said nut is still allowed to automatically conform to any ordinary change of alignment that may be imparted to the seat adjusting screw 44.

It is emphasized that our back adjusting screw 56 is purposely made different as to type of mounting from that employed for the seat adjusting screw 44. In the latter instance, its floating nut 48 is confined against axial movement but without abnormal binding effects. In the case of the back adjusting screw 56, the mode of action is preferably reversed, that is to say the screw is here confined against axial movement while its nut is free to travel therealong. In addition, the fulcrum brackets 37 are carried by the seat underframing and the overhanging rear end of the screw 56 is maintained in all positions of seat adjustment, at a fixed spacing relative to the bracket fulcrums 38. The fact that the depending actuating member of our back is disposed inwardly of and intermediate said brackets, in turn makes for a compact adjusting mechanism of which all linkages may be neatly concealed within the confines of the complementary side-bars 22.

As a further refinement, the lower portion of the cushioned upholstery as applied to the back framework, is preferably bulged out at 41 and made to forwardly overlap the rear top face of the seat cushion in the manner shown in Fig. 3 so as to allow the back to be variably inclined within prescribed limits without however materially opening a correspondingly large visible gap with respect to said seat member.

Finally, attention is directed to Figs. 7 and 8, showing the simple and effective manner in which certain components of our adjusting mechanism may be applied solely to tilting the back of a rear automobile seat without at the same time equipping the seat cushion therewith. These certain similar component parts here utilized have been correspondingly identified by numerals; it will be observed that owing to the absence of any shiftable side bars, a pair of equivalent stationary fulcrum brackets 67 have been substituted for the previously described pivot brackets 37. Such fulcrum brackets are here carried by an inserted body frame 68 that may be inbuilt into the rear body wall while the remaining structural elements of our tiltable seat back and its actuating means remain substantially as disclosed in connection with Figs. 1 to 6 except for the elimination of the seat shifting devices.

It is to be understood that the described adjusting mechanism also finds application to purposes other than automotive seats, and that various changes in the details and mode of manipulation thereof may be resorted to in likewise carrying out our illustrative structural embodiment, all without departing from the spirit and scope of our invention heretofore described and more particularly pointed out in the appended claims.

Claims:

1. In a seat of the reclining type, the combination of a pair of spaced guide-ways, a unitary base frame superimposed across and adapted to slide lengthwise of said ways, a seat cushion mounted upon said frame, a pair of upstanding spaced fulcrum brackets respectively carried by opposite sides of the frame, a reclinable back structure pivotally mounted between said brackets and having a depending bottom edge portion extended down into adjacency with the top of said ways and between said opposite frame sides and a single manipulative member adapted to both adjust the inclination of the back and bodily shift the seat cushion lengthwise of said ways.

2. In a vehicle seat of the reclining type, the combination of a slidably mounted base frame comprising spaced complementary side-bars, a seat cushion supported upon said frame, fulcrum bracket means carried by each of the complementary bars, a reclinable back structure pivotally mounted between said brackets and providing for a pendant portion reaching below said cushion intermediate the seat ends, a stationary nut-like prop disposed beneath the seat cushion, a seat adjusting screw cooperating with said prop serving to bodily shift said frame, an auxiliary adjusting screw carried to travel in unison with said shiftable frame and adapted to actuate said pendant back portion for tilting purposes, and manipulative means for said auxiliary screw.

3. In a vehicle seat of the reclining type, the combination of a horizontally disposed base frame comprising spaced extensions, a seat cushion supported upon said frame, fulcrum bracket means carried by the respective extensions, a back pivotally mounted upon said brackets and having a pendant back portion extending down between said extensions in tiltable relation thereto, means for bodily shifting said base frame together with said brackets, adjusting means serving to variably recline the back relative to the plane of said seat and including a toggle link pivotally attached to said pendant back portion, and manipulative means adapted to selectively actuate the aforesaid shifting or reclining means.

4. In a vehicle seat of the reclining type, the combination of a shiftable base frame including spaced side-bars, a seat cushion supported upon said frame, fulcrum bracket means carried by each such bar, a reclinable back structure pivotally mounted between said brackets, a stationary nut-like prop disposed beneath the seat cushion, a tubular seat adjusting screw cooperating with said prop and adapted to bodily shift said frame together with the back structure mounted thereon, an auxiliary screw serving to adjustably tilt the reclinable back, said screw being placed in tandem axial alignment relative to the first named screw and provided with a stem means positively linked to the back, and common manipulative means of the clutch type adapted to selectively engage either of said screws.

5. In a reclinable vehicle seat, the combination of fulcrum means associated with the respective seat ends, a tiltable back mounted between said fulcrums and which back comprises complementary side-posts and an inter-connecting bottom cross-piece disposed below the fulcrum level, a corner brace strap extending from the medial region of said cross-piece to the respective side-posts, pivotal means associated with the medial region of said strap, an adjusting screw and a trunnioned nut, said screw when rotated being confined against endwise movement and arranged to move the nut axially therealong, and link means interconnecting a trunnion of said nut to the aforesaid pivotal means.

6. In a vehicle seat of the reclining type comprising a pair of spaced guide-ways each providing for an overhanging abutment edge, a unitary base frame superimposed upon said ways and mounted to slide lengthwise thereof, said frame including complementary spaced side-bars each carrying a member respectively adapted to glide beneath its adjacent abutment edge for seat retaining purposes and which frame further comprises a forward cross member and a rear tie piece serving to interconnect said bars, a seat cushion resting upon said frame, a fulcrum bracket means carried by and extending upwardly from each rearward end portion of the respective side bars, a tiltable back structure pivotally mounted between said brackets said structure being provided with a depending portion disposed rearward of the tie piece and extending below the seat bottom, means for shifting said base frame along said ways, and auxiliary adjusting means extending through said forward cross member and adapted to thrust against the rear of said tie piece for back tilting purposes.

7. In a vehicle seat of the reclining type, the combination of a base frame that is longitudinally shiftable and serves to support a substantially rectangular seat cushion thereon, fulcrum bracket means carried by the frame and extending upwardly relative to each of the respective rearward cushion ends, a reclinable back structure pivotally mounted between said brackets in a cooperative relation with the rear edge of the seat cushion, a tubular seat adjusting screw operatively carried with and adapted to bodily shift said frame and its back in unison, a stationary nut engaged by said screw, an auxiliary screw serving to positively tilt the back structure in either direction, said screw being extended through the seat adjusting screw beyond the forward end of the latter, complementary clutch elements including a notch associated with said auxiliary screw and a reversely faced notch for said tubular screw, and a manipulative member located toward the forward end region of the auxiliary screw and adapted to selectively interlock said member with either of said notches.

8. An adjustable vehicle seat comprising a guide surface, a base frame shiftably superimposed upon said surface, prop-like holder means provided with spaced retaining faces disposed transversely with respect to said surface, a nut block of the self-aligning type slidably mounted between said faces and having a limited freedom of movement therealong, said block being provided with a spiral thread whose axis lies normal to said faces and which block is restrained by said faces against substantial axial movement, a manipulative screw cooperating with said thread, said screw being rotatably mounted and serving to shift said base frame, and means arresting rotation of the nut block about the manipulative screw, said means allowing the slidable block to automatically compensate for change in screw alignment.

9. A vehicle seat comprising a pair of spaced guide-ways, a unitary base frame superimposed across and adapted to slide along said ways, said frame including complementary side-bars and a tie piece extending therebetween, a back structure for said seat, bracket means respectively adjoined to each of said bars and adapted to pivotally mount said back, and a reenforcing strap for each of said brackets, the straps each being provided with a tongue respectively adapted to engage opposite end portions of the tie piece.

10. In a reclinable vehicle seat the combination of fulcrum means associated with the respective seat ends, a tiltable back mounted upon said fulcrums and which back comprises a pendant extension disposed inwardly of and located between said fulcrums, pivotal means carried by said extension and which means are adapted to swing into alignment with a reference plane running vertically through said fulcrums, an adjusting screw disposed forwardly of said plane with the screw axis arranged in a normal relationship to said plane, supporting means for said screw, the latter having a rearwardly overhanging end maintained at a fixed spaced distance from said plane, a trunnioned nut cooperating with said overhanging screw end and adapted to travel axially therealong, and a link whose one end is pivotally connected to a trunnion of said nut and whose other end is attached to the aforesaid pivotal means.

In testimony whereof we have signed our names to this specification.

LESLIE A. WENN.
WILLIAM K. BISHOP.